Figure 1:
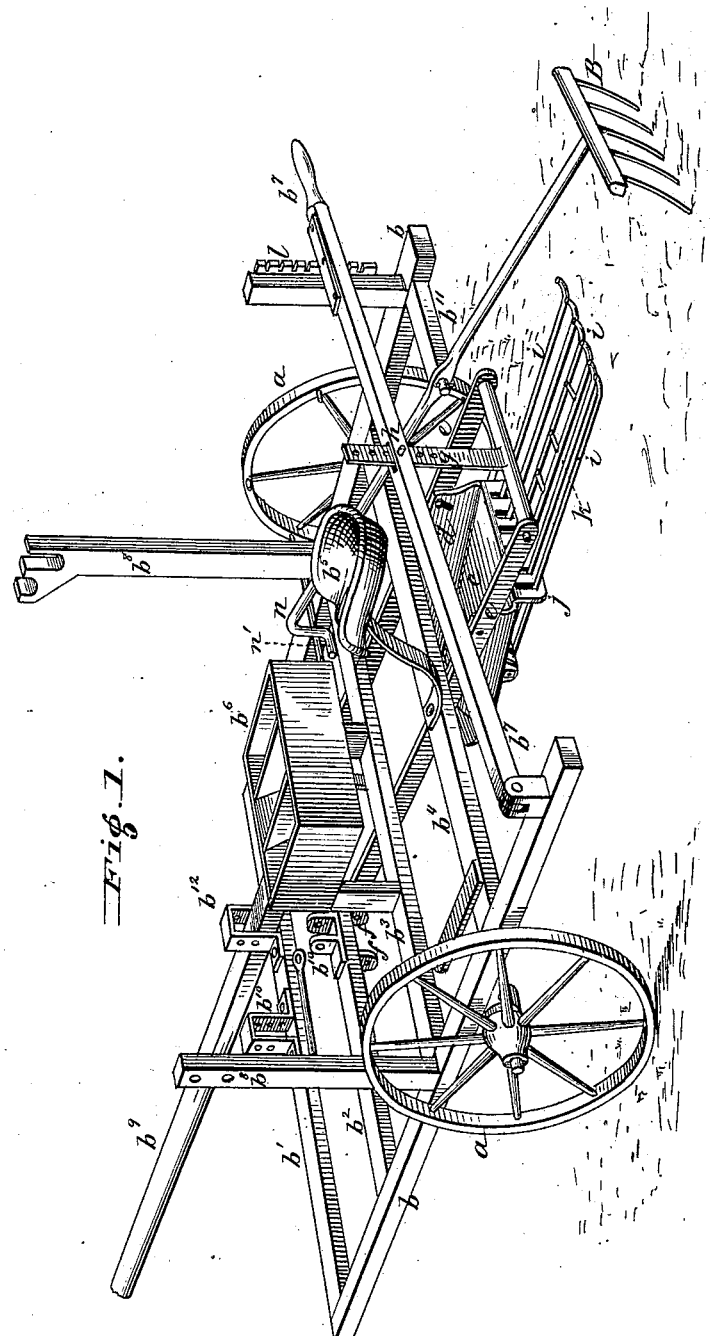

(No Model.) 2 Sheets—Sheet 1.

H. M. KEITH.
Potato Digger.

No. 238,787. Patented March 15, 1881.

Attest:
H. L. Perrine
Floyd Norris

Inventor:
Horace Mason Keith
By Johnson & Johnson
Atty's

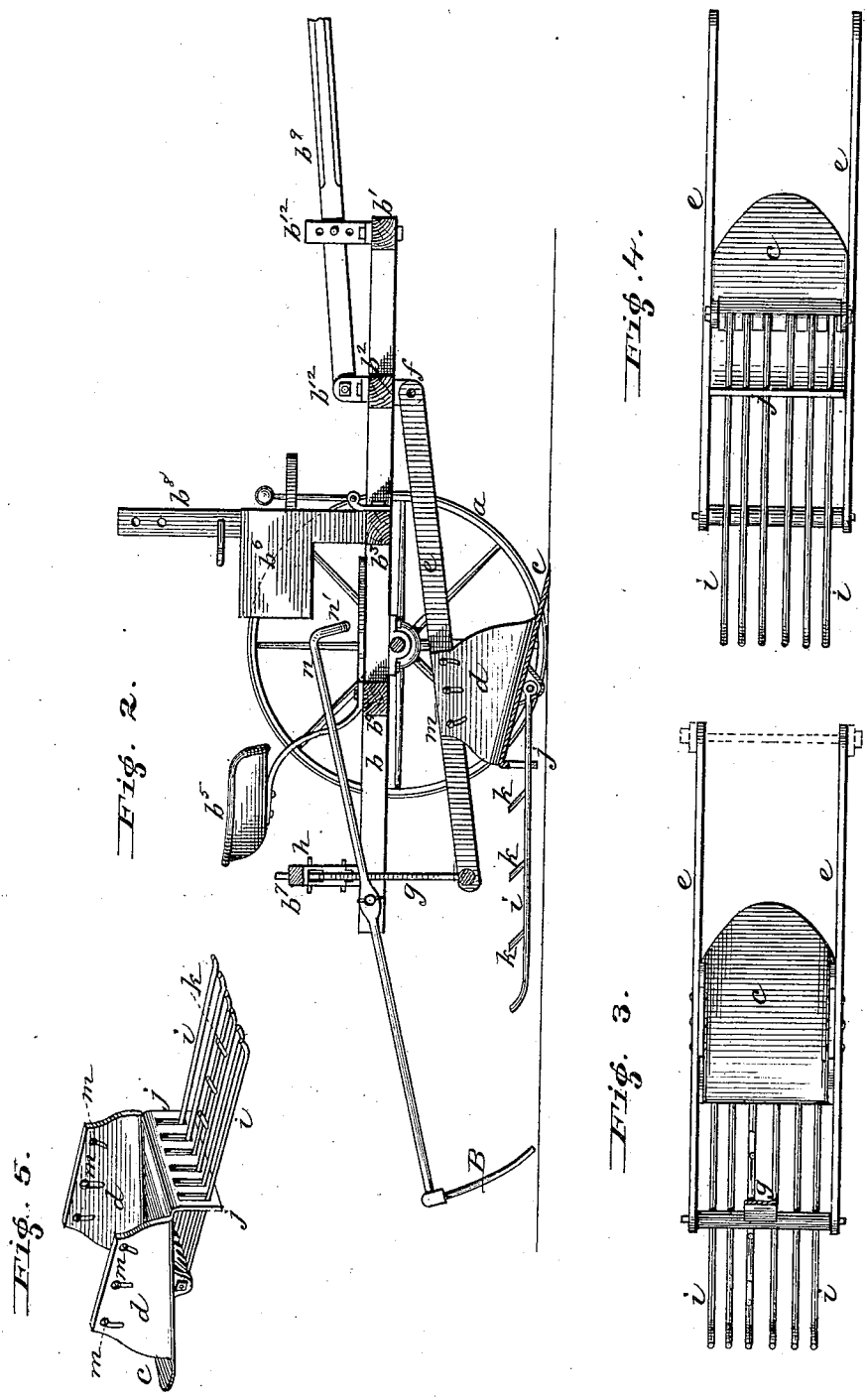

UNITED STATES PATENT OFFICE.

HORACE M. KEITH, OF COMMERCE, ASSIGNOR OF ONE-HALF TO JOEL PEASE HARGER, OF WEST BROOMFIELD, MICHIGAN.

POTATO-DIGGER.

SPECIFICATION forming part of Letters Patent No. 238,787, dated March 15, 1881.

Application filed November 2, 1880. (No model.)

*To all whom it may concern:*

Be it known that I, HORACE MASON KEITH, a citizen of the United States, residing at Commerce, in the county of Oakland and State of Michigan, have invented new and useful Improvements in Potato-Diggers, of which the following is a specification.

In a patent bearing even date herewith I have shown and described a combined agricultural implement in which a potato-planter and potato-digger are adapted for separate use upon the same frame with a laterally-shifting tongue. The combined implement is made and sold as an entirety, and is used in its separate operations or purposes by detaching either the planting and checking-off parts or the digging parts, thereby saving the expense of separate machines for these separate operations.

The invention relates to improvements in potato-digger attachments for such combined implement. These attachments consist of a scoop or shovel provided with rearwardly-projecting barbed fingers, and carried by arms near the side of the frame, hinged to a front cross-bar thereof, and adjustably supported at their rear ends by a cross-lever, in connection with a tongue adjustable laterally upon such frame to give the proper line of draft for the machine in digging or uncovering the potatoes. The scoop is adjustably attached to its carrying-arms, to vary its inclination to allow its point to run at a greater or less depth in the soil, and the fingers are hinged to the under side of the scoop, near the middle of its length, and extend back through a guide-plate depending from the rear edge of the scoop to hold the fingers in line and allow them to rise and fall independently of each other within certain limits. The object of this limited movement of the fingers is to keep them under the soil, so as to uncover the potatoes; otherwise the rear ends of the rods would ride upon the surface and carry the loose earth and potatoes from the shovel along with them. The hinged arms which carry the scoop and its fingers are supported at their rear ends by a vertical brace pivoted to said arms, and adjustably attached to the cross-lever at the rear of and above the frame, for setting the scoop and its fingers to run the proper depth in the soil. In line with the scoop and its fingers a rake is pivoted to the frame, so as to drag by its weight behind the uncovering-fingers and gather the potatoes along in piles. The handle of this rake extends in such relation to a seat on the frame that the occupant can depress the handle either by his foot or hand and raise the rake to free the potatoes and leave them in piles, thus rendering it easier to collect them.

In the accompanying drawings, Figure 1 represents a view in perspective of the frame with the digging attachments and the tongue shifted to one side in the line of draft therewith; Fig. 2, a vertical longitudinal section thereof; Fig. 3, a top view of the scoop and its hinged fingers; Fig. 4, a bottom view of the same; and Fig. 5 the slotted guide for the hinged fingers at the rear edge of the scoop, shown in perspective.

In these several views the same letters indicate the same parts.

In the drawings the digging parts are only shown in their relation to the frame, the planting parts having been removed.

The frame of the combined machine is supported by and upon wheels $a$ $a$, which may turn loosely upon short axles, or with a single connecting-axle, as may be deemed best. It consists of two side bars, $b$ $b$, united at the front by parallel cross-bars $b'$ $b^2$ and at their middle by cross-bars $b^3$ $b^4$, the latter of which carries the seat $b^5$ for the rake-operator. A permanent hopper, $b^6$, is supported upon the bar $b^3$ in front of the axle, and at a point centrally between the wheels. The side bars extend back of the seat and support a cross-lever, $b^7$, from which the rear end of the digging or planting device is suspended, while to the inner front cross-bar, $b^2$, the digging or planting device is pivoted. The standards $b^8$ $b^8$ on the side bars serve to support above the hopper a revolving hill-checker and its operating-connections with a planting-valve. The digging and uncovering attachment is suspended from and beneath the frame, near one of the side bars, while the front cross-bars, $b'$ $b^2$, are provided with loops $b^{12}$, or other means, for securing the tongue $b^9$ in the draft-line of said digging attachment, as shown.

In Fig. 1 the loops $b^{10}$ are for the adjustment of the tongue in a central line of the frame when used as a planter, thus adapting the frame and the tongue for use with attachments for either digging or planting, and for which purpose the carrying-wheels are seven and a half feet apart, so that, the furrow-forming tooth being attached centrally with the hopper, one of the wheels will run in the last-planted row, and thus serve as a mark by which the rows are run at equal distances apart, the wheels occupying the distance of two rows.

The digging attachment consists of a scoop or shovel, $c$, provided with uncovering-fingers, and forming a single adjustable device. The scoop is pointed and has sides $d$, by which it is attached to parallel bars $e\ e$, hinged at their front ends to hangers $f$ of the cross-bar $b^2$, and supported at their rear ends by a pivoted brace, $g$, adjustably attached at $h$ to the cross-lever $b^7$, which, being pivoted to one of the side bars $b$, crosses the frame and is secured beneath a shouldered post or catch, $l$, on the other side bar, thus holding the scoop and fingers firmly to work. The fingers $i$ are hinged to the under side of the scoop near the middle of its length, and extend parallel to each other from six to ten feet in the rear of the scoop, and close enough together to hold the potatoes and bring them to the surface as the machine moves along. They are held at equal distances apart by a plate, $j$, depending from the rear edge of the scoop, and provided with vertical slots, through which the fingers separately pass, and by which they are allowed to rise and fall independent of each other, and to an extent governed by the length of said slots, whereby the fingers are held under the surface and braced against spreading apart at their rear ends. They are provided with upwardly-projecting barbs $k$ at suitable distances along their length, and are also bent upward at their free ends, so as to raise the potatoes to the surface, while the fingers will run beneath the surface. The scoop sides are provided with holes or slots, by which it may be adjusted and secured by bolts $m$ to set its point to run more or less into the ground, while the scoop and its fingers are adjusted by the pivoted brace $g$ to regulate their depth in the soil, so as to bring the scoop well beneath the tubers. The fingers receive the earth and potatoes dug up by the scoop and leave the potatoes strewn along the surface; and I provide a rake, B, the teeth of which drag along the surface by its own weight in rear of the fingers and gather the potatoes into piles for more convenient collecting. The rake-handle $n$ is pivoted to an arm, $b^{11}$, extending inward from the side bar, and the inner end of said handle is cranked or bent, as at $n'$, to allow a person in the seat to place his foot or hand upon and depress this end to raise the rake-teeth and clear the pile when the rake is full. The teeth are close enough together to hold the potatoes, and the weight of the rake is sufficient to hold the teeth in the soil as the rake drags along in the line of the uncovered potatoes.

I claim—

1. In a combined agricultural implement, the permanent frame having the front loop-guides, $b^{12}$, arranged at one side of the center draft-line, and the cross-lever $b^7$, arranged at the rear of the frame, in combination with the arms $e\ e$, hinged to brackets $f$ and adjustably connected to said rear cross-lever by the brace $g$, the scoop $c$, adjustably connected to said arms between the pivots $f$ and said brace, and the fingers $i$ of said scoop, substantially as described, for the purpose specified.

2. In combination with the barbed fingers $i$, independently hinged to and beneath the scoop, the slotted guide $j$ for said fingers depending from the scoop, substantially as and for the purpose described.

3. In a combined agricultural implement, the permanent frame having the front loop-guides, $b^{12}$, for the attachment of a removable tongue, the front brackets, $f$, and the rear cross-lever, $b^7$, for the attachment of a removable digging and separating scoop, $c$, and its fingers $i$, the arm $b^{11}$ at one side of the frame for the attachment of a removable rake in the line of said scoop, and the seat $b^5$, substantially as described, for the purpose specified.

4. The potato-digger herein described, consisting of the scoop $c$, provided with the uncovering-fingers $i$, the guide $j$ therefor, the adjustably-supporting cross-lever $b^7$, the pivoted rake B, and the seat $b^5$, constructed and arranged for operation substantially as herein set forth.

In testimony whereof I have hereunto set my hand in the presence of two subscribing witnesses.

HORACE M. KEITH.

Witnesses:
LUDOVIC R. COLE,
K. D. HARGER.